United States Patent
Büsgen et al.

(10) Patent No.: US 10,806,208 B2
(45) Date of Patent: Oct. 20, 2020

(54) METHOD FOR PRODUCING 3D OBJECTS

(71) Applicant: Covestro Deutschland AG, Leverkusen (DE)

(72) Inventors: Thomas Büsgen, Cologne (DE); Dirk Achten, Leverkusen (DE); Nicolas Degiorgio, Krefeld (DE); Roland Wagner, Leverkusen (DE); Thomas Michaelis, Leverkusen (DE); Maria Elisabeth Beenen-Fuchs, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 341 days.

(21) Appl. No.: 15/567,459

(22) PCT Filed: Apr. 21, 2016

(86) PCT No.: PCT/EP2016/058844
§ 371 (c)(1),
(2) Date: Oct. 18, 2017

(87) PCT Pub. No.: WO2016/170030
PCT Pub. Date: Oct. 27, 2016

(65) Prior Publication Data
US 2018/0104922 A1   Apr. 19, 2018

(30) Foreign Application Priority Data
Apr. 21, 2015   (EP) .................................. 15164524

(51) Int. Cl.
*A43B 1/00*   (2006.01)
*A43B 23/02*   (2006.01)
(Continued)

(52) U.S. Cl.
CPC .......... *A43B 1/0009* (2013.01); *A43B 23/024* (2013.01); *A43B 23/026* (2013.01);
(Continued)

(58) Field of Classification Search
CPC .................................................... A43B 1/0009
See application file for complete search history.

(56) References Cited

U.S. PATENT DOCUMENTS

| 5,904,889 A | 5/1999 | Serbin et al. |
| 7,318,718 B2 | 1/2008 | Ueno |
| (Continued) | | |

FOREIGN PATENT DOCUMENTS

| DE | 9218423 U1 | 3/1994 |
| DE | 102007009277 A1 | 11/2007 |
| (Continued) | | |

*Primary Examiner* — Larry W Thrower
(74) *Attorney, Agent, or Firm* — Jed C. Benson; Donald R. Palladino (57) ABSTRACT

The invention relates to a method for producing a three-dimensional object, the outer surface of which has at least one surface section that is generated in that, by means of an additive production method (layer-building forming method), initially a surface section is produced on a flat base plate (5) in two-dimensional form, comprising the following steps: I) applying at least one curable polymer or curable reaction resin with a respective elastic modulus according to DIN 53504 (effective: 18 Apr. 2015) in the cured state, of <250 MPa in fluid form, as material webs onto a flat base plate (5) by means of a layer-building forming method in order to produce a first layer (6); II) applying a second layer (7) onto the first layer (6) by means of the same or another layer-building forming method, like in step I); III) optionally applying between 1 and 48 additional layers according to step II), wherein each new layer is applied onto the respective previous layer; IV) curing the layers; V) releasing the cured surface section from the flat base plate (5); VI) forming the cured surface section into a three-dimensional object; and VII) securing the three-dimensional object.

13 Claims, 5 Drawing Sheets

(51) Int. Cl.
*A43B 23/04* (2006.01)
*B29D 35/14* (2010.01)
*B33Y 10/00* (2015.01)
*B33Y 80/00* (2015.01)
*B29C 64/118* (2017.01)
*A43D 3/02* (2006.01)
*A63B 71/12* (2006.01)
*B29C 69/02* (2006.01)
*B29D 35/12* (2010.01)
*A63B 71/08* (2006.01)
*B29K 75/00* (2006.01)

(52) U.S. Cl.
CPC ...... *A43B 23/0215* (2013.01); *A43B 23/0235* (2013.01); *A43B 23/042* (2013.01); *A43D 3/02* (2013.01); *A63B 71/1225* (2013.01); *B29C 64/118* (2017.08); *B29C 69/02* (2013.01); *B29D 35/126* (2013.01); *B29D 35/146* (2013.01); *B33Y 10/00* (2014.12); *B33Y 80/00* (2014.12); *A63B 71/08* (2013.01); *B29K 2075/00* (2013.01)

(56) References Cited

U.S. PATENT DOCUMENTS

| | | |
|---|---|---|
| 9,005,710 B2 | 4/2015 | Jones et al. |
| 2005/0212163 A1 | 9/2005 | Bausinger et al. |
| 2009/0126225 A1 | 5/2009 | Jarvis |
| 2010/0095556 A1 | 4/2010 | Jarvis |
| 2014/0182170 A1 | 7/2014 | Wawrousek et al. |
| 2016/0135537 A1 | 5/2016 | Wawrousek et al. |

FOREIGN PATENT DOCUMENTS

| | | |
|---|---|---|
| EP | 0429196 A2 | 5/1991 |
| EP | 2930009 A2 | 10/2015 |
| WO | 00/26026 | 5/2000 |
| WO | 2008/151063 A2 | 12/2008 |

METHOD FOR PRODUCING 3D OBJECTS

CROSS-REFERENCE TO RELATED APPLICATIONS

This application is a national stage application under 35 U.S.C. § 371 of PCT/EP2016/058844, filed Apr. 21, 2016, which claims the benefit of European Application No. 15164524.9, filed Apr. 21, 2015, both of which are being incorporated by reference herein.

FIELD

The invention relates in particular to a method for manufacturing three-dimensional articles, wherein flat plastics components, which are produced by conventional rapid-prototyping methods (additive manufacture), are subsequently shaped into three-dimensional objects. Such flat plastics components can be used, for example, in the production of shoe material or clothing material.

BACKGROUND

Components built up layer by layer and methods for their production are known by the name additive manufacturing or generative manufacturing method (also called rapid prototyping, rapid manufacturing, rapid tooling, additive manufacturing). Examples of such methods are selective laser sintering or three-dimensional printing as is described, for example, in WO 00/26026, DE 10 2004 014 806, DE 102007009277, WO/2014/015037, WO 2014/100462 or EP 293 00 09.

Further generative methods and devices for producing 3-dimensional components are known, for example, from EP 0429 196 A2, DE 92 18 423 U1, DE 195 15 165 C2 or DE 101 27 383.

Customized insoles from the 3D printer are already known and are already supplied commercially, e.g. by Sols (http://www.sols.com) and RS Print (http://www.rsprint.be). WO 2014/100462 describes a method for producing an individually customized sole of a shoe by means of 3D printing.

The idea of manufacturing whole shoes using a 3D printer also exists already. However, attempts have hitherto always been made to print the shoe as a whole (see e.g. http://3dshoes.com/, http://continuumfashion.com/shoes.php or http://recreus.com/en/15free-3d-models (as at Apr. 8, 2015)).

WO/2014/015037 describes a method for 3D printing an object, in particular a complete shoe, which requires a sole to be 3D printed and an upper to be 3D printed. The upper of the shoe is thereby produced directly as a finished 3D print. However, this method is lengthy and requires a high temperature for producing the multiple layers of an object by the method described in WO/2014/015037.

SUMMARY

It is an object of the invention to overcome the disadvantages of the prior art at least in part.

It is a further object of the invention to provide a novel, quicker and simplified method for producing three-dimensional objects such as, for example, objects having a large surface area and a small thickness such as a shoe upper, a support corset or a protector (e.g. shoulder protector, upper arm protector, knee protector).

BRIEF DESCRIPTION OF DRAWINGS

FIG. 1 shows schematically the process for manufacturing a two-dimensional surface portion on the planar base plate 5, wherein a first layer 6 and a second layer 7 have already been completed and a third layer 7' is now being applied to the second layer 7.

FIG. 9 shows schematically a two-dimensional surface portion for producing a shoe upper. This consists of two layers of parallel tracks, rotated through 90° relative to one another, two layers of a honeycomb structure lying one on top of the other, two layers of an all-over pattern with lettering, and a layer of eyelet reinforcement. The shoe upper again has a heel region 8 and openings 10 in the layers of the pattern or lettering.

DETAILED DESCRIPTION

The invention is based on the finding that many components having a large surface area and a small thickness of the outer walls can be converted mathematically by means of topological methods into a continuous, flat, "two-dimensional" form. The topology of a three-dimensional object can be produced in a simple manner by shaping the two-dimensional form with in each case an individually adapted structure.

A first aspect relates to a method according to the invention for producing a three-dimensional object whose outer surface comprises at least one surface portion which is generated by first producing on a planar base plate, by means of an additive manufacturing method (layer-building shaping method), a surface portion in two-dimensional form, comprising the following steps:
I) applying at least one curable polymer or curable reaction resin with in each case an elastic modulus (E modulus) in the cured state of <250 MPa in flowable form as material tracks to a planar base plate by means of a layer-building shaping method in order to produce a first layer;
II) applying a second layer to the first layer by means of the same layer-building shaping method as in step I);
III) optionally applying from 1 to 48 further layers according to step II), wherein in each case a new layer is applied to the respective preceding layer;
IV) curing the layers;
V) detaching the cured surface portion from the planar base plate;
VI) shaping the cured surface portion into a three-dimensional object; and
VII) fixing the three-dimensional object.

A second aspect relates to a method according to the invention for producing a three-dimensional object whose outer surface comprises at least one surface portion which is generated by first producing on a planar base plate, by means of an additive manufacturing method (layer-building shaping method), a surface portion in two-dimensional form, comprising the following steps:
i) applying at least one curable polymer or curable reaction resin with in each case an elastic modulus (E modulus) in the cured state of <250 MPa in flowable form as material tracks to a planar base plate by means of a layer-building shaping method in order to produce a layer, wherein the layer constitutes a continuous surface with or without openings (e.g. honeycombed);
ii) curing the layer;
iii) detaching the cured surface portion from the planar base plate;
iv) shaping the cured surface portion into a three-dimensional object; and
v) fixing the three-dimensional object.

A preferred embodiment of the first aspect relates to a method wherein a plurality of the individual material tracks in the lateral direction or the application orientation of the material tracks of the first layer are deposited with different thicknesses.

A preferred embodiment of the two aspects relates to a method wherein the layer-building shaping method is fused filament fabrication (FFF), ink-jet printing or photopolymer jetting.

A further preferred embodiment of the two aspects and their preferred embodiments relates to a method wherein the same curable polymer or curable reaction resin is used in all the layers.

A further preferred embodiment of the first aspect and its preferred embodiments relates to a method wherein at least one layer comprises a different curable polymer or curable reaction resin.

A further preferred embodiment of the two aspects and their preferred embodiments relates to a method wherein at least one curable polymer or curable reaction resin for applying a layer is used in the form of a flowable and curable substance mixture.

A further preferred embodiment of the two aspects and their preferred embodiments relates to a method wherein at least one curable polymer or curable reaction resin for applying a layer is used in the form of at least two different flowable and curable substance mixtures.

A further preferred embodiment relates to a method wherein at least one curable polymer or curable reaction resin for applying a layer is used in the form of a flowable and curable substance mixture or wherein at least one curable polymer or curable reaction resin for applying a layer is used in the form of at least two different flowable and curable substance mixtures, wherein the substance mixtures comprise at least one filler selected from the group consisting of reinforcing fibers selected from polyamide fibers, glass fibers, carbon fibers or aramid fibers or reinforcing particles selected from inorganic or ceramics nanopowders, metal powders or plastics powders or carbon black and organic and inorganic pigments.

A further preferred embodiment of the two aspects and their preferred embodiments relates to a method wherein the polymer in a flowable and curable substance mixture for producing at least one layer is selected from silicone, PVC and EVA, PE, PU and TPE. Preferred TPEs are TPU or TPV.

A further preferred embodiment of the first aspect or of one of its further preferred embodiments relates to a method wherein a material track of a layer, upon application of material tracks of a new layer to that layer, is only partly hardened, and final hardening only takes place together with the hardening of the material track(s) deposited thereon.

A further preferred embodiment of the two aspects and their preferred embodiments relates to a method wherein curing takes place by cooling of thermoplastics, by cold or hot polymerization, polyaddition, polycondensation, addition or condensation or by electromagnetic radiation or heat-initiated polymerization.

A further preferred embodiment of the two aspects and their preferred embodiments relates to a method wherein curing is carried out by a UV or IR light source guided immediately downstream of the spray nozzle.

A further preferred embodiment of the two aspects and their preferred embodiments relates to a method wherein shaping takes place by bending the two-dimensional surface portion, folding the two-dimensional surface portion, shaping by placing the two-dimensional surface portion on a last, thermoforming where at least one hot-workable polymer is present in a two-dimensional surface portion.

A further preferred embodiment of the two aspects and their preferred embodiments relates to a method wherein fixing takes place by the welding, adhesive bonding, stapling, tacking, nailing, riveting, stitching, pinning, Velcro-fastening, snap-fitting, or a combination thereof, of at least one partial surface of the three-dimensional object according to the invention either to at least one further partial surface of the three-dimensional object according to the invention and/or to at least one partial surface of a further object.

A further preferred embodiment of the two aspects, particularly preferably of the first aspect, and their preferred embodiments relates to a method wherein the three-dimensional object is a shoe upper.

A third aspect relates to a method according to the invention for producing a three-dimensional object whose outer surface comprises at least one surface portion which is generated by first producing on a planar base plate, by means of an additive manufacturing method (layer-building shaping method), a surface portion in two-dimensional form, comprising the following steps:

I. applying at least one curable polymer or curable reaction resin with in each case an elastic modulus (E modulus) in the cured state of <250 MPa in flowable form as material tracks to a planar base plate by means of a layer-building shaping method in order to produce a first layer;
II. applying a second layer to the first layer;
III. optionally applying from 1 to 48 further layers according to step II., wherein in each case a new layer is applied to the respective preceding layer;
IV. curing the layers;
V. detaching the cured surface portion from the planar base plate;
VI. shaping the cured surface portion into a three-dimensional object; and
VII. fixing the three-dimensional object.

The preferred embodiments for the first two aspects are likewise applicable to the third aspect and likewise form preferred embodiments therefor.

In addition to the first aspect of the invention, different methods of application can be used in step II. of the third aspect of the invention in the application of a second layer and also in step III. in the optional application of the further layers. Preferably, the same materials, such as polymers, as described for the first two aspects are used. Preferably, a portion of the layers is applied by means of ink-jet printing while another portion of the layers is applied by means of an FFF method. Particularly preferably, first at least one layer of a polymer is applied by means of an FFF method to the base plate, and at least one further layer of a polymer is applied by means of ink-jet printing to the at least one layer. An advantage of the FFF method is the very rapid build-up of material in the production of the surface portion. An advantage of ink-jet printing is the high resolution of the applied material, whereby the production of very smooth surfaces is possible. A further advantage of ink-jet printing is the possibility of varying many different materials and thus also different effects such as color, gloss or haptics. The different methods can also alternate within the application of a layer. Furthermore, it is preferred that at least a portion of at least one layer is applied to the preceding layer by means of a material applied by hand. Material applied by hand can be applied, for example, by means of a paintbrush, a knife or a spatula. Screen printing methods can also be used for the application of layers or portions of layers in step II. or III. All the possible variations of application methods are conceivable for portions of layers or entire layers.

Preferably, further materials, for example in the form of an interlayer such as a textile or a film, are applied to one of the layers applied in step I., II. or III. The textile can be present, for example, in the form of a non-crimped fabric or in the form of fibers. Furthermore, it is preferred to integrate at least one further element into the surface portion. Integration of the at least one further element is preferably carried out by introduction between two layers formed in step I., II. or III. Alternatively or in addition, the at least one further element can be arranged, extending over a plurality of layers, on the surface portion during or after its manufacture. Preferably, the further element is selected from the group consisting of an electronic component, a decorative element, an absorbent element or a combination of at least two of those elements. Examples of an electronic component are RFID tags, antennae, pressure, acceleration, temperature sensors or combinations of at least two of those components. Examples of a decorative element are textiles printed in color, holograms, metal badges or combinations of at least two of those elements. Examples of an absorbent element are plastics foams such as polyurethane foams or rubber foams or other liquid-absorbing, that is to say absorbent, polymers such as polyacrylic acid or polyacrylamides.

Preferably, pores or voids, which are described in the following in relation to the methods of the first three aspects, are filled by additional material. Filling can take place by one or more identical or one or more different methods as for the production of the surface portion. Preferably, filling of the pores or voids takes place by means of the same method as the method chosen in step I), i) or I. Further preferably, filling of the pores or voids takes place by means of the same method and material with which the layer surrounding the pores or voids was built up.

Further preferably, additional layers of an additional material can be applied before or after shaping. Suitable as the material for the additional layers are all materials that are considered suitable for this purpose by the person skilled in the art. Preferably, the materials are polymers, in particular curable polymers or curable reaction resins. Further preferably, they are curable polymers or curable reaction resins as are described for the first layer of the first aspect of the invention.

Alternatively to the above-described sequence of method steps VI) and VII) or iv) and v) or VI. and VII., fixing in step VII), v) or VII. can take place before shaping in step VI), iv) or VI.

A fourth aspect relates to a shoe upper obtainable by a method according to the invention.

A fifth aspect relates to a shoe obtainable by a method according to the invention and subsequent fixing of the resulting shoe upper to a sole.

A sixth aspect relates to a method according to the invention wherein the three-dimensional object is a support corset or a protector for the shoulder, upper arm, lower arm, thigh, shin, torso, elbow or knee.

A seventh aspect relates to a protector obtainable by a method according to the invention.

An eighth aspect relates to a tubular structure obtainable by a method according to the invention.

The indefinite term "a" generally stands for "at least one" in the meaning of "one or more". The person skilled in the art will appreciate, according to the situation, that it is not the indefinite article but the definite article "one" in the meaning of "1" that must be meant, or the indefinite article "a" also includes the definite article "one" (1) in an embodiment.

All the preferred embodiments described herein can be combined with one another provided that they do not contravene applicable physical laws.

3D Printing Method

The expression "additive manufacture" is known to the person skilled in the art and is the umbrella term for various methods for rapidly producing prototype components starting from design data.

The expression "layer-building manufacturing method by means of flowable and curable substance mixtures", as used herein, preferably refers to FFF but can also refer to any other known 3D printing method by means of flowable and curable substance mixtures, such as, for example, photopolymer jetting (http://www.custompartnet.com/wu/jetted-photopolymer; as at Apr. 8, 2015) or ink-jet printing methods (http://www.custompartnet.com/wu/ink-j et-printing; as at Apr. 8, 2015).

Figure 1:
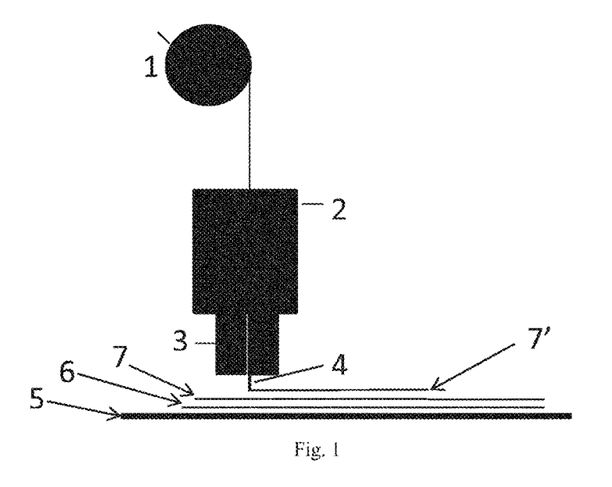
FIG. 1 shows a typical FFF method setup with a polymer/substance mixture supply in the form of a polymer filament coil 1, an extruder 2, an outlet nozzle 3 with an outlet diameter 4, wherein a liquefied substance mixture from the polymer filament coil is discharged from the outlet nozzle 3 as a material track onto a substrate. A plurality of material tracks are thereby produced as a single layer on a substrate in the form of a planar base plate 5, which material tracks can form a continuous surface consisting of joined material tracks, a surface consisting of geometric shapes joined to one another, such as a honeycomb structure. Specifically.

The expression "fused filament fabrication" (FFF, sometimes also called plastic jet printing (PJP)), as used herein, refers to a manufacturing method from the field of additive manufacture with which a workpiece is built up layer by layer from a fusible plastics material. A schematic setup for an FFF method is shown in FIG. 1. The plastics material can be used with or without further additives such as fibers. Machines for FDM belong to the machine class of the 3D printers. This method is based on liquefying a plastics or wax material in filament form by heating. When the material subsequently cools, it solidifies. The material is applied by extrusion using a heating nozzle which is freely displaceable in relation to a manufacturing plane. Either the manufacturing plane can be fixed and the nozzle is freely displaceable, or a nozzle is fixed and a substrate platform (with a manufacturing plane) can be displaced, or both elements, the nozzle and the manufacturing plane, are displaceable. The speed at which the substrate and the nozzle are displaceable relative to one another is preferably in a range of from 1 to 60 mm/s. The layer thickness is in a range of from 0.025 and 1.25 mm, depending on the application, and the outlet diameter of the material jet (nozzle outlet diameter) from the nozzle is typically at least 0.05 mm. In layer-by-layer prototype production, the individual layers thus combine to form a complex part. The build-up of an article conventionally takes place by repeatedly moving, in each case line by line, over a working plane (formation of a layer) and then displacing the working plane upwards "in a stacking manner" (formation of at least one further layer on the first layer), so that a shape is formed layer by layer.

The nozzle is preferably so configured that amounts of material can be discharged either continuously or in drop form.

In the present method according to the invention, the nozzle is preferably moved in the 3D printing method over the planar base plate (when the first layer is being applied), or over layers which have already been applied, at a distance which corresponds to 0.3 times to once, preferably 0.3 times to 0.9 times, such as, for example, 0.3 times to 0.8 times, 0.4 times to 0.8 times or 0.5 times to 0.8 times, based on the diameter of the material filament to be applied (nozzle outlet diameter). This correlation between the distance of the nozzle from the substrate (the substrate is either the planar base plate or a layer which has already been applied) and the nozzle outlet diameter ensures that the material is pressed onto the substrate with a certain contact pressure and better adhesion is thus produced between the layers of the surface portion that is being formed.

The substance mixtures which are used in the method according to the invention become flowable shortly before the nozzle or in the nozzle when heated to at least 60° C. (above this temperature, adhesives known to the person skilled in the art, for example, can be made flowable). Other substances, such as, for example, thermoplastics (e.g. polycarbonate (PC)), require temperatures up to 300° C. in order to become flowable. The person skilled in the art knows the temperature ranges for making known thermoplastic polymers flowable. Preferably, the temperature to which the liquefied substance mixtures are heated, which is also the outlet temperature of the substance mixtures from the nozzle (nozzle outlet temperature), is in the range of from 100° C. to 300° C., more preferably in the range of from 150° C. to 260° C.

A liquefied substance mixture is applied in a method according to the invention to the planar base plate through the nozzle as a material track for producing a first layer, which consists of individual material tracks running parallel to one another, of material tracks connected together to form a continuous surface, or of honeycomb or other geometric figures formed by material tracks. The viscosity of the substance mixture after it leaves the nozzle as a material track is thereby sufficiently high that the web that forms does not run away completely. It is known to the person skilled in the art what viscosities/track diameters must be present in a method such as FFF, photopolymer jetting or ink-jet printing.

As already described elsewhere, it is preferred that the material track is applied in the form of drops to the base plate or a previously applied layer. Particularly suitable methods for applying the polymer or reaction resin are photopolymer jetting or ink-jet printing.

Owing to the ratio between the distance of the nozzle to the substrate and the filament diameter (nozzle outlet diameter), the leveling off (and thus spreading) of the material stream leaving the nozzle can result in the formation, by application of the material tracks, either of a continuous surface or of material tracks which are separated from one another by free surfaces. If the first layer consists of material tracks which do not touch one another laterally and if on the first layer in the following step a second layer is applied on the first layer, then there must be contact points (e.g. points of intersection) or contact surfaces between the two surfaces in order to ensure that the two layers adhere to one another. In this case, the surface of a first layer is defined in a method according to the invention by the second layer applied to the first layer. In a case in which a first layer was applied in the form of mutually parallel material tracks and a second layer was applied on the first layer, either the value of the angle of the application orientation (magnitude of the application direction) of the material tracks of the second layer is ≠0°, based on the application orientation of the material tracks of the first layer (whereby pores can be formed through the two layers), or the application orientation of the material tracks of the second layer is identical with the application orientation of the material tracks of the first layer, but the material tracks of the second layer are offset by about half a spacing, preferably by half a spacing, based on the spacing between the material track mid-points of adjacent material tracks of the first layer. Each track of the second layer must thereby be at least so wide that it touches each of the two tracks of the first layer that are situated beneath it. The offsetting of the material tracks ensures, by connecting the two layers together, that the connection is continuous (no pore formation).

Preferably, pores formed by two layers have a size of from 0.3 times to 1000 times the maximum track thickness of two layers forming the pores. In a preferred embodiment, the size of a pore is from 0.3 times to 5 times the maximum track thickness of two layers forming the pores.

In a preferred embodiment, the distance of the nozzle, for example in an FFF method, from the substrate (planar base plate, interlayer or previously printed layer), and the distance of the material tracks from one another in the formation of a (new) layer is so chosen in a method according to the invention that there is no surface formation during formation of a (new) layer but all the layers of the surface portion are composed of parallel material tracks. The angle of the application orientation of the material tracks which form a layer is, in the case of two successive layers, ≠0°, based on the application orientation of the first of the two layers. Preferably, the angle of the application orientation in the case of at least two successive layers is in the range of from 30° to 150°, such as, for example, in the range of from 45° to 135° or in the range of from 60° to 120° or in the range of from 85° to 95° or 90°. The person skilled in the art will appreciate that there can be variations of up to ±5° in the application orientation of the material tracks of a second layer on a first layer, since the surface of the substrate for the second layer is naturally locally uneven due to the mutually parallel material tracks of the substrate layer.

Planar Base Plate

Planar base plates for additive manufacturing methods are known to the person skilled in the art. A planar base plate can be produced by means of conventional or generative techniques, for example a base plate can be milled and offers the advantages of maintaining dimensional and shape accuracy and of a very good surface quality. Many different materials are available for milling, such as, for example, Ureol, wood or aluminum. For a specific geometry, it can be expedient to produce the molding base generatively, for example by means of laser sintering.

A planar base plate serves to shape the surface of the surface portion that is produced in a method according to the invention. Accordingly, a first layer in a method according to the invention can be applied directly to a planar base plate, or an interlayer such as a textile or a film, which reproduces the flat form of the planar base plate on the first layer of a method mold according to the invention, can be present, on which interlayer the first layer is applied and to which the material tracks of the first layer are connected, so that the interlayer becomes part of the surface portion and thus also part of the three-dimensional object.

The surface of the planar base plate consists preferably of glass, carbon, polypropylene, stainless steel, or a surface coated with Teflon, polyimide, etc., or alternatively is purposively provided with an adhesive primer layer which facilitates adhesion of the objects to be printed to the surface and thereby minimizes twisting of the desired objects to be printed. The adhesive layer is typically a low-melting compound which can optionally be pre-dissolved in a suitable solvent. A very wide variety of adhesion promoters are known to the person skilled in the art.

A "planar base plate" within the meaning of the present invention is a substantially planar substrate in the working plane, to which the first layer of a surface portion is applied in a production method according to the invention. Substantially planar means that a substrate spans an XY plane of a Cartesian coordinate system with three axes X, Y and Z (Z would then be=0) and has no or only slight material-related deviations on the Z-axis (see e.g. FIG. 2). The deviations in the Z direction for a plane defined in the XY direction are preferably not more than 3 mm, more preferably not more than 1 mm, yet more preferably, however, the deviations in the Z direction of the surface are not more than twice the maximum applied layer thickness of a first layer (but not more than 3 mm, preferably not more than 1 mm), particularly preferably the deviations in the Z direction of the surface are smaller than the maximum applied layer thickness of a first layer, wherein the planar base plate is larger in its orthogonal extensions in an imaginary XY plane in each case at least by a factor of 5, preferably by a factor of 10, more preferably by a factor of 50, yet more preferably by a factor of 100, than the maximum deviation in the Z plane. For example, in the case of a height difference of 2 mm a round, planar base plate has a diameter of at least 1 cm, a diameter of at least 2 cm, a diameter of at least 100 cm or a diameter of at least 200 cm; in the case of a square, planar base plate, the edges that form the base plate each have at least a length of 1 cm, 2 cm, 100 cm or 200 cm.

The shape of a planar base plate is irrelevant provided that the base plate has a planar surface which serves as the substrate for a first layer of a surface portion and is larger than or the same size in all its X and Y orientations as the surface of the first layer of a two-dimensional surface portion according to the present invention. The shape of the base plate can be symmetrical, for example: round, rectangular, square, etc., or asymmetrical.

In a preferred embodiment, the planar base plate can be heated in order to delay premature curing of the material by temperature-related solidification of the first layer. The heating temperature of the base plate is preferably in a range of from 30° C. to 180° C., such as, for example, in a range of from 40° C. to 140° C. or from 60° C. to 100° C. However, the temperature to which the planar base plate is warmed should not be greater than the nozzle outlet temperature used in a method according to the invention for rendering flowable the flowable and curable substance mixture. Preferably, the temperature to which the base plate is heated is at least 10° C. below the nozzle outlet temperature.

Heating of the planar base plate is preferably carried out at least until, after completion of the application of the first layer of the surface portion, at least a second layer has been applied to the first layer.

Substance Mixtures

A curable polymer or curable reactive resin within the meaning of the present invention can be used alone or in the form of "flowable and curable substance mixtures" in a method according to the invention. The expression "flowable and curable substance mixtures" refers to a substance mixture comprising at least one curable polymer or at least one curable reaction resin and at least one additive such as, for example, fibers, UV curing agents, peroxides, diazo compounds, sulfur, stabilizers, inorganic fillers, plasticizers, flame retardants and antioxidants. In the case of reaction resins in particular, mixtures of two or more reaction resins can be mixed beforehand or are mixed on the substrate. In the latter case, application can be carried out, for example, from different nozzles. The flowable and curable substance mixtures can be of different natures but must be liquid or viscous extrudable or liquid printable plastics compositions under the conditions of the method according to the invention. They can be thermoplastics, silicones, unvulcanized rubber or curable reaction resins.

Thermoplastics can be, for example, acrylonitrile-butadiene-styrene (ABS), polyamides (PA), polylactate (PLA), polymethyl methacrylate (PMMA), polycarbonate (PC), polyethylene terephthalate (PET), polyethylene (PE), polypropylene (PP), polyurethane (PU), polystyrene (PS), polyether ether ketone (PEEK), polyvinyl chloride (PVC), celluloid and thermoplastic elastomers (TPE) such as TPO (thermoplastic elastomers based on olefin, predominantly PP/EPDM, e.g. Santoprene (AES/Monsanto)), TPV (crosslinked thermoplastic elastomers based on olefin, predominantly PP/EPDM, e.g. Sarlink (DSM), Forprene (SoFter)), TPU (thermoplastic elastomers based on urethane (thermoplastic urethanes), e.g. Desmopan, Texin, Utechllan (Bayer)), TPC (thermoplastic polyester elastomers/thermoplastic copolyesters, e.g. Keyflex (LG Chem)), TPS (styrene block copolymers (SBS, SEBS, SEPS, SEEPS and MBS), e.g. Styroflex (BASF), Septon (Kuraray), Thermolast (Kraiburg TPE) or Saxomer (Polyplast Compound Werk GmbH)).

The flowable and curable substance mixtures or curable polymers or curable reactive resins in a method according to the invention can be polymers and/or polymerizable oligomers or monomers with or without additives such as, for example, polyamide, Kevlar, glass, aramid or carbon fibers, rayon, cellulose acetate, and/or conventional natural fibers (e.g. flax, hemp, coconut, etc.). As well as or instead of fibers, the substance mixtures can also comprise reinforcing particles, in particular selected from inorganic or ceramics nanopowders, metal powders or plastics powders, for example from $SiO_2$ or $Al_2O_3$, $AlOH_3$, carbon black, $TiO_2$ or $CaCO_3$. Substance mixtures can further comprise, for example, peroxides, diazo compounds and/or sulfur.

Preferred curable polymers or curable reactive resins or flowable and curable substance mixtures comprising a curable polymer or curable reactive resin which are used in a method according to the invention consist of/comprise elastomers.

Particularly preferred in a method according to the invention are substance mixtures comprising/consisting of PVC, EVA, PE, PU, elasticized PVC, rubber, silicone or TPE (in particular TPU or TPV).

In a particularly preferred embodiment, PE, PU or TPE (in particular TPU or

TPV) are used in a method according to the invention as flowable and curable substance mixtures or curable polymers. In a further preferred embodiment, such flowable and curable substance mixtures of PE, PU or TPE (in particular TPU or TPV) additionally comprise fibers and/or reinforcing particles, wherein both short fibers <2 mm and long fibers >2 mm are possible. It is also possible to use "endless fibers", which extend over the entire length of an applied material track. In the extrusion of the flowable and curable substance mixture in a method according to the invention, the presence of fibers leads to an anisotropic reinforcement of the lines of the flowable and curable substance mixture that form, without appreciably influencing the ability of the material tracks to bend in the longitudinal direction. Fibers are preferably added in amounts of up to 40% by weight, based on the extruded plastics material. Typically, the E modulus increases with the addition of fibers by a factor of >1.5, particularly preferably >2.

In a further preferred embodiment there are used in a method according to the invention curable reaction resins or flowable and curable substance mixtures comprising curable reaction resins which, for example, cure with UV activation or enter into a chemical reaction with one another or with air. Examples thereof are two-component polyurethanes (2K PU), two-component silicones (2K silicones), moisture-curing silicones or PU systems, air-curing or radically curing unsaturated polyesters or rubber materials as well as all UV-curing reactive resins known to the person skilled in the art which are based on, for example, vinyl and acrylic compounds, and also combinations of different curing mechanisms.

E modulus data for polymers and reactive resins as used herein relate, unless explicitly indicated otherwise, to the E modulus of the polymers or reactive resins in the crystalline (cured) state and not to the E modulus of a polymer or reactive resin under extrusion conditions of a flowable and curable substance mixture.

The E modulus is determined in the present case in accordance with DIN 53504 (as at Apr. 18, 2015).

In a further preferred embodiment, the E modulus of a polymer, preferably of a thermoplastic polymer, for producing a first layer in a method according to the invention, optionally in a flowable and curable substance mixture (such as, for example, PE, PU or TPE (in particular TPU or TPV, optionally in each case with added fibers), is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. The E modulus of these substance mixtures which are flowable and curable (under the conditions of the extrusion method) may be higher, for example as a result of the use of fibers, but the E modulus of the polymer used is not more than 250 MPa.

In a preferred embodiment, the E modulus of a further plastics material for producing at least one further layer in a method according to the invention, optionally in a flowable and curable substance mixture (such as, for example, PE, PU or TPE (in particular TPU or TPV, optionally in each case with added fibers), is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. The E modulus of these substance mixtures which are flowable and curable (under the conditions of the extrusion method) may be higher, for example as a result of the use of fibers, but the E modulus of the polymer used is not more than 250 MPa.

In a further preferred embodiment, the E modulus of all the plastics materials for producing a layer in a method according to the invention, optionally in a flowable and curable substance mixture (such as, for example, PE, PU or TPE (in particular TPU or TPV, optionally in each case with added fibers), is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. The E modulus of these substance mixtures which are flowable and curable (under the conditions of the extrusion method) may be higher, for example as a result of the use of fibers, but the E modulus of the polymer used is not more than 250 MPa.

In a further preferred possible embodiment, the E modulus of a continuous layer, in particular at least two continuous layers, is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. Individual plastics filaments of which the layer(s) is or are composed may also have a significantly higher E modulus.

In a further preferred embodiment, the E modulus of a polymer, preferably of a reactive resin, for producing a first layer in a method according to the invention, optionally in a flowable and curable substance mixture (e.g. 2K PU, 2K silicones, moisture-curing silicones or PU systems, air-curing or radically curing unsaturated polyesters or rubber materials, UV-curing reactive resins based, for example, on vinyl and acrylic compounds), is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. The E modulus of these substance mixtures which are flowable and curable (under the conditions of the extrusion method) may be higher, for example as a result of the use of fibers, but the E modulus of the reactive resins used is not more than 250 MPa.

In a preferred embodiment, the E modulus of a further plastics material for producing at least one further layer in a method according to the invention, optionally in a flowable and curable substance mixture (e.g. 2K PU, 2K silicones, moisture-curing silicones or PU systems, air-curing or radically curing unsaturated polyesters or rubber materials, UV-curing reactive resins based, for example, on vinyl and acrylic compounds), is less than 250 megapascals (MPa), preferably less than 200 MPa, more preferably less than 150 MPa, yet more preferably less than 100 MPa, such as, for example, an E modulus in the range of from 1 to 100 MPa or an E modulus in the range of from 5 to 50 MPa. The E modulus of these substance mixtures which are flowable and curable (under the conditions of the extrusion method) may be higher, for example as a result of the use of fibers, but the E modulus of the reactive resin used is not more than 250 MPa.

In a further embodiment, the E modulus of a further plastics material for producing at least one further layer in a flowable and curable substance mixture (such as, for example, PA or PLA, the substance mixture can in each case optionally have added fibers) is more than 500 megapascals (MPa), such as, for example, more than 1000 gigapascals (GPa), such as, for example, in a range of from 1 GPa to 3 GPa, or in a range of from 1 GPa to 2.5 GPa. The E modulus of these substance mixtures which are flowable and curable (under the conditions of the extrusion method) may, however, be even higher, for example as a result of the use of fibers. However, an E modulus should not be greater than 20 GPa, because otherwise extrusion through a nozzle or passage through an inkjet head can only be carried out with very great difficulty. In a preferred embodiment, such layers of polymers or reactive resins with E modulus values over 250 MPa have a smaller areal extent than the surface area of the first layer, for example the spread in terms of area formed by a second or subsequent layer which is applied in a method according to the invention is in a range from 0.01 to 90%, such as, for example, from 0.1 to 80%, from 0.1 to 70%, from 0.1 to 60%, based on the surface area of the first layer. Layers For producing each layer according to an additive manufacturing method according to the invention, material in the form of material tracks is deposited track by track according to geometric data.

The material in the form of material tracks is preferably applied in the form of drops to the base plate or one of the layers which may already be on the base plate. A drop within the meaning of the invention is understood as meaning any amount of material whose maximum extension in any spatial direction is not more than 1 mm, preferably not more than 0.5 mm or preferably not more than 0.1 mm. Preferably, the mean diameter of the drops is in a range of from 0.01 to 1 mm, or preferably in a range of from 0.05 to 0.7 mm, or preferably in a range of from 0.1 to 0.5 mm. Mean diameter is understood according to the invention as meaning the mean value calculated from the diameter of the drop at the point having the greatest extension and the diameter of the drop at the point having the smallest extension. The drops can thereby be applied to the entire surface of the base plate or of the previously applied layer or merely to a portion of the surface of the base plate or previously applied layer. The drops can have a shape selected from the group consisting of circular, oval, rectangular or a combination of at least two of those shapes. Preferably at least one material track, or preferably at least two material tracks, or preferably all the material tracks for forming the three-dimensional object are applied in the form of drops to the base plate or a previously applied layer.

Depending on the viscosity, the size of the drops and the spacing of the drops, the drops may coalesce to form a material track which covers the whole surface area of the surface to be coated, such as the base plate or previously applied layer. Alternatively, the spacing between the drops can be so chosen that separate material tracks in the form of drops cover only a portion of the base plate or previously applied layer. Preferably, the material track covers a portion of the base plate or previously applied layer in a range of from 20 to 100%, or preferably in a range of from 30 to 100%, or preferably in a range of from 50 to 100%, or preferably in a range of from 80 to 100%, based on the total surface area of the base plate or the total surface area of the previously applied layer. In this manner it is possible to produce three-dimensional objects in which individual layers can be in contact with more than the two layers immediately adjacent thereto.

The drops have a volume preferably in a range of from 1 $\mu$l to 500 $\mu$l, or preferably in a range of from 5 $\mu$l to 400 $\mu$l, or preferably in a range of from 10 $\mu$l to 300 $\mu$l. The material track, which is preferably formed of drops, preferably has a length in a range of from 0.1 mm to 100 m, or preferably in a range of from 0.5 mm to 50 m, or preferably in a range of from 1 mm to 10 m. The thickness of the material track after application is preferably in a range of from 1 $\mu$m to 1.25 mm, or preferably in a range of from 5 $\mu$m to 0.9 mm.

In addition to the deposition methods which have been known for a long time, such as inkjet, the application of material in the form of material tracks can be carried out, for example, using ARBURG plastic freeforming (APF) by means of the "freeformer" device from ARBURG GmbH+ Co. KG, in which, on the basis of 3D CAD data, very small drops can be applied to the desired surface.

In the method according to the invention it is provided that, according to step I), i) or step I., a curable polymer or curable reaction resin with in each case a modulus of elasticity (E modulus) in the cured state of <250 MPa is applied in flowable form as material tracks to a planar base plate. This is understood as meaning that at least 80% by weight, in particular at least 90% by weight, preferably at least 95% by weight and up to 100% by weight of the layer that is produced consists of cured polymers and/or reaction resins which, in this state, have an E modulus of <250 MPa. Naturally, this includes forms in which individual filaments of a layer have an E modulus of ≥250 MPa. These can be, for example, glass filaments, quartz filaments, carbon fibers or other inorganic fibers or plastics fibers with an E modulus ≥250 MPa, such as, for example, Kevlar or aramid fibers. The plastics fibers can either likewise be produced on the planar base plate by the method according to the invention or they can be inserted, without previously being melted.

The layer thickness of a layer of a three-dimensional object produced by a method according to the invention is preferably in a range of from 0.025 mm to 1.25 mm, more preferably in a range of from 0.1 mm to 0.9 mm.

The outlet diameter of the material jet from the nozzle (=nozzle outlet diameter) is preferably in the range of from 0.025 mm to 1.4 mm in methods according to the invention. However, it is preferably at least 0.03 mm. Preferably, it is in a range of from 0.03 mm to 1.3 mm, more preferably in a range of from 0.15 to 1 mm. A smaller distance between the nozzle and the substrate (planar base plate, interlayer, or already applied layer (layers)), based on the nozzle outlet diameter, results in a smaller thickness (height) of a layer. The material is thereby squashed into a strand with an oval cross-section. Without being bound to the explanation, a larger nozzle outlet diameter in relation to the distance of the nozzle from the substrate leads to better adhesion of the newly formed layer on the substrate in question.

Preferably, the first layer in a method according to the invention is produced from a polymer, yet more preferably a thermoplastic polymer, which has an E modulus of less than 250 MPa, more preferably less than 200 MPa, yet more preferably less than 150 MPa, particularly preferably less than 100 MPa, such as, for example, an E modulus in the range of from 1 MPa to 100 MPa or an E modulus in the range of from 5 to 50 MPa.

According to the present invention, different layers of a surface portion can be produced from different substance mixtures, or all the layers of a surface portion can be produced from the same substance mixture. In addition, it is also possible for one layer to consist of different substance mixtures, but the curable polymer or curable reactive resin in these different substance mixtures is preferably the same in each case (e.g. a layer can consist of PU mixtures with different coloring pigments).

Different layers can have different shapes. The shape of the at least one surface portion is chosen according to the type of three-dimensional structure whose outer surface has at least one surface portion according to the method described herein that is to be produced. If the surface portion is, for example, the upper region of a shoe or part of an upper region of a shoe, the person skilled in the art will accordingly choose an asymmetric shape for the surface portion, which is so chosen that, after shaping and fixing of the surface portion into a 3-dimensional object, the object already has the three-dimensional shape of an upper region of a shoe. As examples, two-dimensional surface portions according to the present invention are shown schematically as FIGS. 7 and 9.

In a preferred embodiment, the extension of the first layer in the working plane determines the greatest areal extension of the layers of the surface portion from which a three-dimensional object is formed.

In a further preferred embodiment, the first layer in a method according to the invention represents the largest layer, in terms of area, in a surface portion, or none of the further layers of a surface portion, produced by the method described herein, has a larger surface area than the first layer; particularly preferably, if the XY working plane in a method according to the invention is viewed orthogonally, none of the further layers of a surface portion in the X and/or Y extension is situated outside the area which is formed by the first layer on the planar base plate.

In a further preferred embodiment, the first layer is formed on a planar base plate, in which the value of the height difference of the planar base plate on an imaginary Z axis in a superimposed orthogonal coordinate system, wherein the planar base plate is defined in the XY plane (see FIG. 2), based on the surface area of the first applied layer on the planar base plate, is not more than 5%, preferably not more than 3%, more preferably not more than 1%, yet more preferably not more than 0.5%, particularly preferably not more than 0.1%, and wherein both the maximum, orthogonal extensions of the surface portion in the XY plane are greater than the height difference on the relevant surface of the planar base plate by at least a factor of 5, preferably at least a factor of 10, more preferably at least a factor of 25, yet more preferably at least a factor of 50, such as, for example, at least a factor of 100.

As already mentioned, a layer in a method within the meaning of the invention is composed of individual material tracks which, depending on the spacing from one another and the relationship between the nozzle outlet diameter and the distance of the nozzle from the substrate, are present in the layer as individual track(s) also in the cured surface portion or form a flat layer by coalescing, which layer can optionally have openings. As already mentioned, the material tracks can consist of regions of material applied in drop form to the base plate or a previously applied layer.

"Pores" within the meaning of the present invention are formed by two layers, wherein both layers have spaces between the material tracks forming a layer and the application angle of the two layers relative to one another is ≠0°. "Openings" within the meaning of the present invention are areas within a layer which are not covered with material of the layer, which are generated by material tracks which are sometimes spatially separate but have at least 2 points of contact with one another, or by a material track which comes into contact/intersects with itself again in the application direction (e.g. a circle) (e.g. hexagonal grid in FIG. 6, 9 or 10). "Voids" within the meaning of the present invention are interruptions in a layer in which surfaces of a plane are not in contact and the distance between those surfaces of a layer is at least 5 material track thicknesses.

If the material tracks are applied in the form of drops, it is possible by varying the spacing of the drops relative to one another or by choosing the size, such as the diameter of the drops, to generate a void, for example in the form of a pore, without material in that layer. If no material is applied in a layer structure at the same point over a plurality of layers, then voids can be generated over a plurality of material tracks. Preferably, the voids have an extension within the layer in a range of from 0.01 to 1 mm, or preferably in a range of from 0.05 to 0.7 mm, or preferably in a range of from 0.1 to 0.5 mm. Preferably, the voids have an extension perpendicular to the layer in a range of from 0.01 to 1 mm, or preferably in a range of from 0.05 to 0.7 mm, or preferably in a range of from 0.1 to 0.5 mm.

These tracks can be applied to the substrate in question not only linearly but also, for example, in a meandering pattern, for example parallel to one another, or the application orientation can be changed.

A layer within the meaning of the invention can consist of material tracks with consistently largely equal parallel spacing relative to one another, which material tracks do not touch one another and are connected to one another only by contact with a layer located beneath or above them. It is likewise possible that the layer consists of a continuous surface, such as, for example, a flat layer with or without openings or voids. Furthermore, the continuous layer can be formed by material tracks which do not run parallel to one another but in which at least two material tracks touch one another more than once and can thus form connected, optionally geometric figures, such as hexagons, circular or non-symmetrical pores. Preferably, all the material tracks of such a layer have more than 2, preferably more than 5, yet more preferably more than 10 points of contact with adjacent material tracks.

Preferably, a layer in a method according to the invention is characterized in that it is formed on the same substrate. A layer within the meaning of the present invention can also consist of a plurality of surfaces which are not in contact or of material tracks which have a spacing between the surfaces and/or material tracks upon application of at least 5 material track thicknesses, preferably at least 10 material track thicknesses, more preferably at least 20 material track thicknesses (voids), which are applied according to the invention to a substrate. Such a structure can be used, for example, as reinforcing rings for shoelaces in a shoe upper.

The substrate of a layer that is newly to be applied in a method according to the invention can be, for example, the planar base plate, an interlayer or the last layer applied. In a further embodiment of the present invention, the substrate for a layer that is newly to be applied in a method according to the invention is not only the last layer applied but also more than one of the layers already applied (e.g. in the case of openings or voids on the last applied layer or a smaller last applied layer compared with the new and the previously applied layer). A possible form is the application of the first of the two layers of an all-over pattern and/or lettering to the second layer of the layers forming the honeycomb structure and the second layer of the first two layers consisting of parallel tracks rotated through 90°. Owing to the large spacings (openings) in the third and fourth layer (the honeycomb pattern), the material tracks of the first of the two pattern/lettering layers are applied by a nozzle in a method according to the invention both to the material tracks of the fourth layer that form the hexagons and in the openings of the honeycomb structure on the material tracks of the second layer which are offset by 90° relative to the material tracks of the first layer.

Accordingly, one embodiment of the present invention is directed to surface portions and three-dimensional objects, or to methods according to the invention that result in these surface portions or three-dimensional objects, wherein at least one layer is applied to two or more previously applied layers. This happens, for example, when a second layer, which has been applied to a lower first layer, has spacings between material tracks, voids or other geometric openings (e.g. hexagonal openings) which are sufficiently large that newly applied material tracks of a third layer not only rest on the material of the second layer but the material, owing to the flow behavior in the flowable state, is also deposited directly on the material of the first layer as a result of the spacings between the material tracks of the second layer or the voids in the second layer. However, the layer is in this case still definable by its mutually parallel material tracks or continuous surface or continuous material tracks, which form asymmetrical or geometric figures such as honeycombs.

In particular when at least one layer is formed by application of a material track in the form of drops, it is possible for a previously applied layer to come into contact with a layer applied thereafter, which would not be possible if the base plate or the preceding layer was coated over the entire surface.

The thickness profile of an individual material track can accordingly be changed during the extrusion in the longitudinal direction. In particular, it is important that a minimal thickness of 0 mm can also be achieved thereby (no extrusion at this point). As a result, the deposition of material can be stopped over portions or the entire width of a material track and openings or voids in a layer of a surface portion can be achieved.

An advantageous procedure for producing voids (cavities) in the component is to close the nozzle opening during jetting or extrusion in the corresponding regions that are to be left open or to interrupt the flow of material through the nozzle at that point and open it again after that point has been passed, or to stop the material feed upstream of the nozzle and start it again when the point has been passed.

It is important for the cohesion of the material tracks within a layer, of the layers with one another, or for the interlaminar strength of the finished component, that the layers of material bind materially to one another as far as possible. To this end, it is provided in particular that the bottom material track or geometric forms such as honeycomb structures are only partially cured when a further layer is applied, and final curing only takes place together with the curing of the material tracks deposited thereabove. This is possible, for example, by starting curing of the material just deposited at a rate such that reactive components are still present in the following cycle of material deposition. The recrystallization of still amorphous polymers of the material track just deposited, or of the deposited material (in the case of continuous layers or, for example, honeycomb structures), must thereby be adjusted only such that it at least remains dimensionally stable, that is to say does not run off. Preferably, the rate of curing is so established that final curing takes place together with the curing of the material track deposited immediately above.

As already mentioned, different material compositions can also be used within a layer and also within a material track. This is possible, for example, by means of multi-head extrusion and allows, for example, the application of different materials (e.g. different colors within a layer) in succession but in the same layer.

It is preferred, however, that a layer consists in each case of the same polymer or reactive resin, independently of the further additives added to the polymer or reactive resin. Accordingly, a preferred embodiment is directed to a method according to the invention wherein each layer of a surface portion consists of material tracks comprising the same polymer or reactive resin. A further embodiment is directed to a method according to the invention wherein each layer of a surface portion consists of material tracks comprising the same polymer or reactive resin.

Surface Portion

A "two-dimensional surface portion" for use in the production of a three-dimensional article within the meaning of the present invention refers to a structure wherein the extension—after production by a generative production method and before shaping into a three-dimensional object—of the individual layers in the direction of the X and Y axis ($\Delta X$ and $\Delta Y$) in an imaginary Cartesian coordinate system is in each case greater at least by a factor of 5, such as, for example, by a factor of 10, preferably by at least a factor of 20, more preferably by at least a factor of 30, than the height of the surface portion, which is determined by the number of layers formed (extension in the Z direction: $\Delta Z$). A surface portion within the meaning of the present invention is, in other words, a preferably flat object which consists of from 1 to not more than 50 or, in a method according to the invention in which there is applied a first layer comprising tracks which do not touch one another and run preferably parallel to one another, from 2 to not more than 50 layers. The expression "from 2 to not more than 50 layers" refers, in the case of a surface portion within the meaning of the present invention, to the point of the surface portion with the maximum number of layers which are applied in a method according to the invention orthogonally to the working plane (layers arranged one above the other). In other words, at no point of a surface portion produced by a method according to the invention are more than 50 layers applied one above the other in a method according to the invention, but fewer layers may be applied one above the other, for example at other points.

In a preferred embodiment, the number of layers which form the two-dimensional surface portion is in the range of from 2 to 50, preferably in the range of from 2 to 30, more preferably in the range of from 2 to 20, yet more preferably in the range of from 2 to 16.

In a further preferred embodiment, the number of layers is 1, wherein this layer is a flat layer with or without openings.

Preferably, the height of a surface portion (orthogonal extension of the surface portion relative to the layer orientation (Z axis)=number of layers arranged one above the other) is not more than 6.25 cm, more preferably not more than 1 cm, more preferably not more than 0.5 cm, yet more preferably not more than 0.25 cm. Preferably, the minimum height of a surface portion is not less than 0.025 mm, more preferably not less than 0.1 mm, yet more preferably not less than 0.2 mm, such as, for example, 0.5 mm.

Preferably, a surface portion produced by a method according to the invention consists of from 1 to 50 layers, preferably from 2 to 50 layers, wherein each layer, independently of any others, has a thickness (height) in the range of from 0.025 mm to 1.25 mm, more preferably in a range of from 0.1 mm to 0.9 mm.

In a preferred embodiment, the surface area of a surface portion produced by a method according to the invention is at least 5 $cm^2$, preferably at least 10 $cm^2$, more preferably at least 25 $cm^2$, such as, for example, at least 40 $cm^2$, at least 50 $cm^2$ or at least 100 $cm^2$, but the maximum orthogonal extensions in the working plane are in each case greater at least by a factor of 5, preferably by a factor of 10, more preferably by a factor of 20, yet more preferably by a factor of 30, even more preferably at least by a factor of 50, than the maximum deviation in the Z plane.

Preferably, function- and weight-optimized structures are produced in a method according to the invention, such as, for example, honeycomb structures, by the method according to the invention. However, a two-dimensional surface portion can also contain function- and weight-optimized structures (for example a honeycomb structure in the middle or as the final layer), which can be produced separately and placed on the two-dimensional surface portion or on a layer of a still unfinished two-dimensional surface portion. Expediently, a standard product is thereby used, which is cut to size before being inserted. The material of the structure can be plastics material, paper, FRP, glass fiber mat, metal or ceramics. In a preferred embodiment, a surface portion has at least one layer which consists of mutually parallel material tracks or of a continuous surface. The track density of the material tracks in the case of layers consisting of a continuous surface is 100%. The track density of the material tracks in a layer consisting of mutually parallel material tracks is generally in a range of from 0.1% (1000-fold spacing between two tracks, based on the material track thickness) to 100% (surface, no spacing between the applied material tracks), particularly preferably between 1% and 100%, for example between 10% and 100%.

Curing Process

After application of at least two layers in a method according to the invention, and optionally after application of further layers to produce a surface portion within the meaning of the present invention, a substance mixture can be made to cure, for example, by cold or hot polymerization or polyaddition or polycondensation, addition (e.g. PU addition) or condensation or also initiation by electromagnetic radiation, in particular UV radiation. Thermally curing plastics mixtures can be cured by a corresponding IR radiation source.

Accordingly, a preferred embodiment is directed to a method in which curing of the two-dimensional surface portion is achieved by lowering the temperature of the material tracks below the temperature range of the melting range of a flowable and curable substance mixture (the application temperature in an FFF method, for example, is accordingly within or preferably above the melting range of the corresponding flowable and curable substance mixture).

A further preferred embodiment is accordingly directed to a method in which curing of the two-dimensional surface portion takes place by using a UV-activatable curing agent. Suitable UV-activatable curing agents are, for example, products from BASF under the trade name Irgacure which, depending on the chemical composition, initiate a curing reaction in suitable compounds, which frequently carry double bonds, at different wavelengths by photochemical release of radicals.

In the prior art there are described various two- or multi-component systems which can be printed. For example, there is known from DE 19937770 A1 a two-component system which comprises an isocyanate component and an isocyanate-reactive component. Drop jets of the two components are generated, which drop jets are so oriented that they combine to form a common drop jet. In the common drop jet, the reaction of the isocyanate component with the isocyanate-reactive component takes place. The common drop jet is directed onto a carrier material where, with the formation of a polymeric polyurethane, it is used to build up a three-dimensional article.

A surface portion can be detached from the planar base plate. This can take place wholly before shaping or firstly in part as a component of the process of shaping the three-dimensional object. If there is an interlayer between a planar base plate and a first layer according to a method according to the invention, the expression detaching the cured surface portion from the planar base plate refers to the detachment of the surface portion together with the interlayer (such as a textile or a film) from the planar base plate.

Three-Dimensional Object Whose Outer Surface Comprises at Least One Surface Portion which has been Produced by the Method Described Herein A three-dimensional structure within the meaning of the present invention can be parts of an item of footwear, such as a shoe, or an item of clothing or part of an item of clothing, such as, for example, protective clothing or parts of protective clothing, for example protectors in motorcycle clothing, individually shaped filters, tubes, gaiters, concertina-type gaiters, pneumatic springs, bandages, corsets, stockings, etc.

In a preferred embodiment, a three-dimensional structure is an item of footwear or part thereof, and a portion or the entirety of the outer surface has been produced by the method described herein; preferably a three-dimensional structure is or is part of a shoe upper which is secured and fixed to a shoe sole.

In a further preferred embodiment, a three-dimensional structure is a curved protector, for example a protector adapted, preferably individually adapted, to the shoulder region or the upper arm region, for example for shoulders, upper arms or elbows, as is used, for example, in motorcycle clothing, which is produced by the method described herein.

Shaping

A three-dimensional object can be produced from a two-dimensional surface portion by any known shaping method, provided that the conditions of that method (e.g. high temperature) do not lead to damage to the surface portion. Possible shaping methods are, for example, bending, folding, shaping by placing a two-dimensional surface portion on a last, thermoforming where at least one thermoplastic polymer is present in a two-dimensional surface portion (thermoplastics soften when heated. They can then be brought into a new shape with low shaping forces. After cooling, they retain that shape), etc. A combination of the above-mentioned shaping methods can also be carried out simultaneously or in succession. Preferably, the two-dimensional surface portion is shaped into a three-dimensional object by being placed on a last.

In the shaping in step VI), iv) or VI. of the method according to the invention, the cured surface portion is preferably shaped into at least two portions which are at angles to one another. Preferably, the cured surface portion is shaped into two angled portions. Preferably, the at least two angled portions are oriented relative to one another during shaping in a range of from 20 to 90°, or preferably in a range of from 30 to 90°, or preferably in a range of from 40 to 90°.

The at least two portions at angles to one another can have equal surface areas or different surface areas. Equal surface areas is preferably understood as meaning a difference in the surface areas in a region of less than 10%, or preferably of less than 5%, or preferably of less than 3%, based on the total surface area of the cured surface portion. Different surface areas is consequently understood as meaning a difference in the surface areas of 10% and more. Preferably, one of the angled portions has a surface area in a range of from 2 to 100 times, or preferably in a range of from 3 to 80 times, or preferably in a range of from 5 to 70 times, based on the surface area of the portion at an angle thereto.

Preferably, the cured surface portion is shaped by at least twice the value, or preferably by at least three times the value, or preferably by at least five times the value, of the thickness of the surface portion at its thickest point, in each case based on the larger surface portion formed during shaping. Further preferably, the cured surface portion is shaped in a range of from 2 to 1000 times, or preferably in a range of from 3 to 500 times, or preferably in a range of from 5 to 100 times the thickness at the thickest point of the cured surface portion.

Fixing

Fixing of a three-dimensional object from a two-dimensional surface portion can take place by methods known to the person skilled in the art. It can take place, on the one hand, by fixing the three-dimensional object to another object. For example by joining a shoe upper (shaft), which has been shaped from a two-dimensional surface portion, to a shoe sole, which then holds the shaft (the three-dimensional object) in its three-dimensional shape.

On the other hand, fixing of a three-dimensional object shaped from a two-dimensional surface portion can take place by joining points or surfaces of the three-dimensional object to one another. For example, a tube can be fixed by joining two longitudinal surfaces of a two-dimensional surface portion, or a two-dimensional surface portion can be fixed after shaping into a shoe upper by joining its heel regions.

Fixing can also be achieved by a combination of the two possibilities described above, for example fixing a shoe upper at the heel regions and by joining to a shoe sole.

Fixing can take place, for example, by the welding, adhesive bonding, stapling, tacking, nailing, riveting or pinning of at least one partial surface of the three-dimensional object according to the invention to at least one further partial surface of the three-dimensional object according to the invention and/or to a partial surface of a further object.

A further possibility for fixing a two-dimensional surface portion is thermoforming, provided that the surface portion has at least one layer comprising a thermoplastic. In this method, shaping takes place by means of preset molds (a positive mold and a matching negative mold, which clamp the object to be shaped between them). It is a condition within the meaning of the present invention that the flat surface of the two-dimensional surface portion undergoes shaping in the shaping operation in the Z axis lying orthogonally to the plane of the two-dimensional surface portion. Fixing is effected in this case by cooling the object, which is now three-dimensional. For example, a protector in the form of a curved surface can be produced in this manner.

The invention will be explained in greater detail below by means of examples and FIGS. 1 to 11.

FIG. 1 shows a typical FFF method setup with a polymer/substance mixture supply in the form of a polymer filament coil 1, an extruder 2, an outlet nozzle 3 with an outlet diameter 4, wherein a liquefied substance mixture from the polymer filament coil is discharged from the outlet nozzle 3 as a material track onto a substrate. A plurality of material tracks are thereby produced as a single layer on a substrate in the form of a planar base plate 5, which material tracks can form a continuous surface consisting of joined material tracks, a surface consisting of geometric shapes joined to one another, such as a honeycomb structure. Specifically, FIG. 1 shows schematically the process for manufacturing a two-dimensional surface portion on the planar base plate 5, wherein a first layer 6 and a second layer 7 have already been completed and a third layer 7' is now being applied to the second layer 7.

Figure 2:
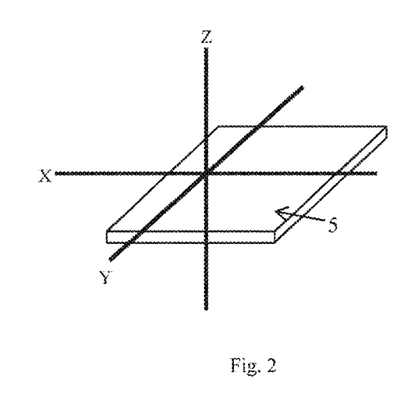
FIG. 2 shows the planar base plate 5 with a Cartesian coordinate system with axes X, Y and Z projected thereon.

FIG. 2 shows the planar base plate 5 with a Cartesian coordinate system with axes X, Y and Z projected thereon.

Figure 3:
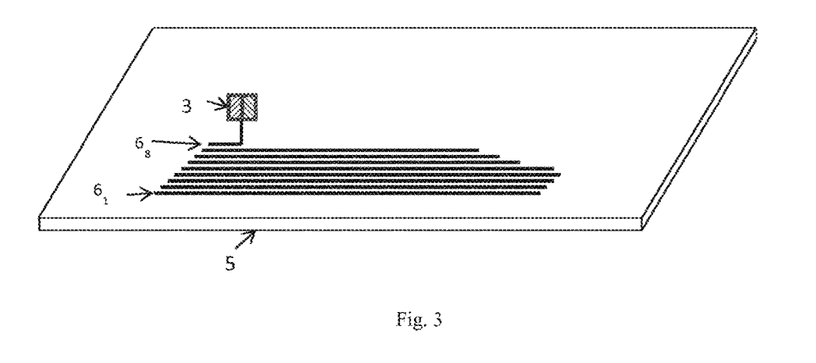
In FIG. 3, the application of material tracks for a first material layer on the planar base plate 5 by means of the outlet nozzle in the form of a spray nozzle 3 is depicted. The first layer 6 is composed of individual material tracks $6_1$ to $6_8$.

In FIG. 3, the application of material tracks for a first material layer on the planar base plate 5 by means of the outlet nozzle in the form of a spray nozzle 3 is depicted. The first layer 6 is composed of individual material tracks $6_1$ to $6_8$.

Figure 4:
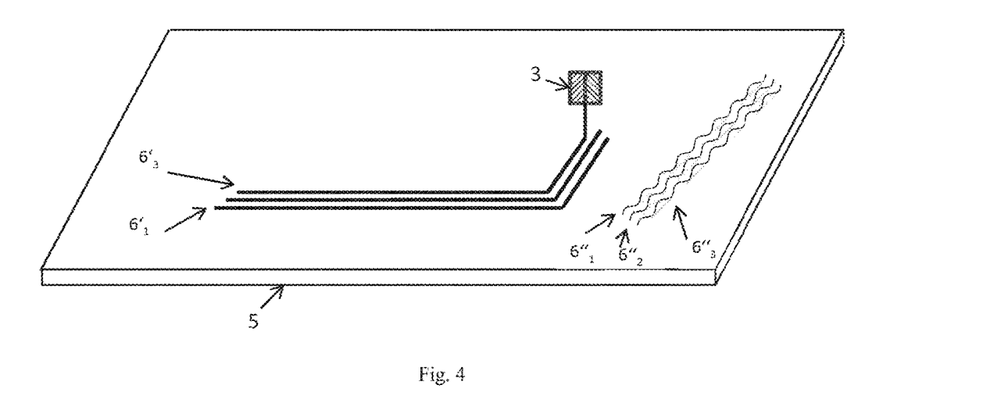
FIG. 4 shows material tracks, running parallel to one another, of a first plane 6' which have been applied to the planar base plate 5 by means of the spray nozzle 3 and have a change in orientation, and material tracks of a first plane 6" which run parallel to one another and have been applied in meandering lines.

FIG. 4 shows material tracks, running parallel to one another, of a first plane 6' which have been applied to the planar base plate 5 by means of the spray nozzle 3 and have a change in orientation, and material tracks of a first plane 6" which run parallel to one another and have been applied in meandering lines.

Figure 5:
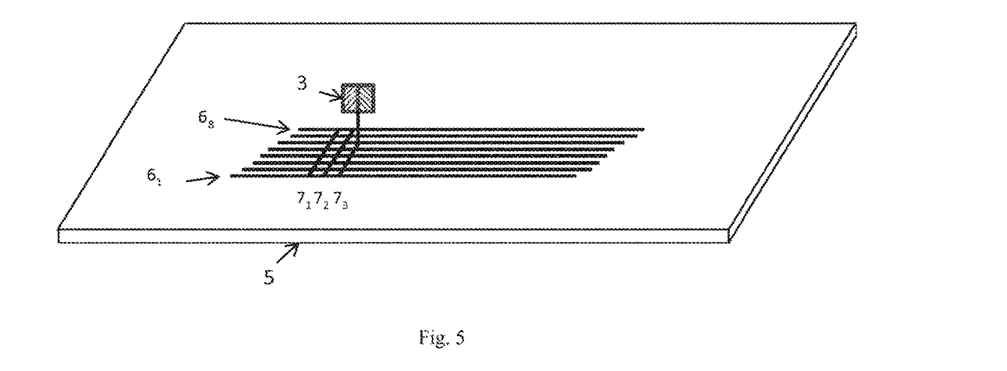
FIG. 5 shows schematically the application of a second layer 7 to a first layer 6, wherein the material tracks $7_1$ to $7_3$ of the second layer 7 are applied to the first layer 6 at an 80° angle relative to the application orientation of the material tracks $6_1$ to $6_8$ of the first layer 6.

FIG. 5 shows schematically the application of a second layer 7 to a first layer 6, wherein the material tracks $7_1$ to $7_3$ of the second layer 7 are applied to the first layer 6 at an 80° angle relative to the application orientation of the material tracks $6_1$ to $6_8$ of the first layer 6.

Figure 6:
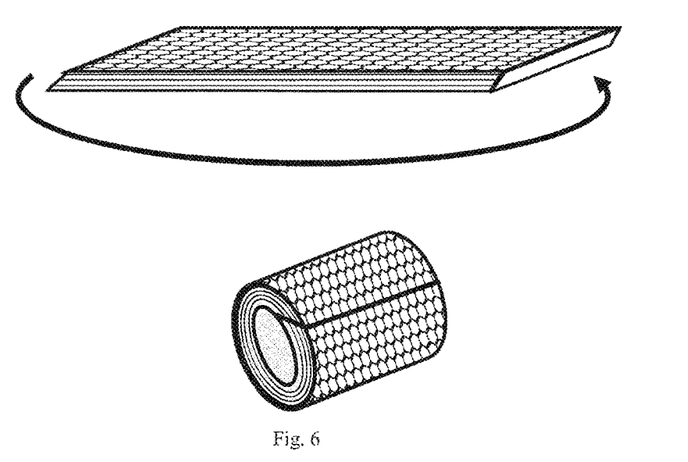
FIG. 6 shows schematically the production of a three-dimensional object in the form of a tube from a two-dimensional surface portion consisting of six layers. In this embodiment, the individual layers lie slightly offset one above the other in order to permit better fixing (adhesive surface) of the surface portion after shaping into the three-dimensional object.

FIG. 6 shows schematically the production of a three-dimensional object in the form of a tube from a two-dimensional surface portion consisting of six layers. In this embodiment, the individual layers lie slightly offset one above the other in order to permit better fixing (adhesive surface) of the surface portion after shaping into the three-dimensional object.

Figure 7:
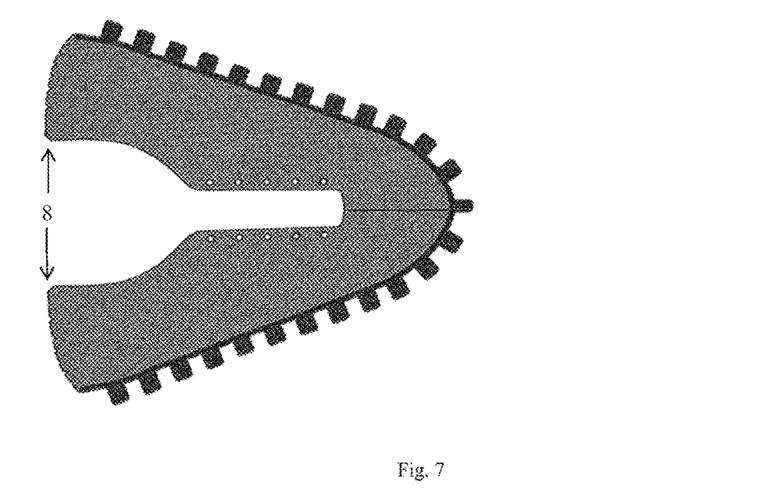
FIG. 7 shows schematically a two-dimensional surface portion for producing a shoe upper with a later heel region 8 of the shoe upper.

FIG. 7 shows schematically a two-dimensional surface portion for producing a shoe upper with a later heel region 8 of the shoe upper.

Figure 8:
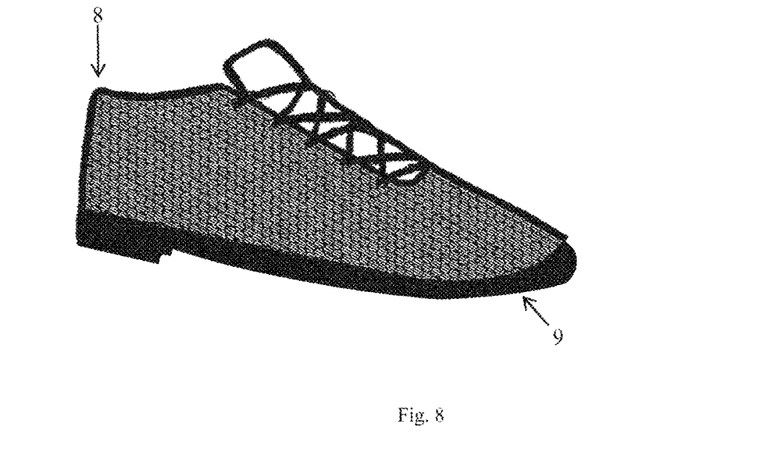
FIG. 8 shows schematically a shoe upper as a three-dimensional object which has been shaped from the two-dimensional surface portion according to FIG. 7. The three-dimensional object can be fixed by, for example, adhesive bonding, tacking, riveting, welding, pinning of the heel parts in the region of the heel region 8. A further fixing is possible by applying the part of a shoe upper to a shoe sole 9. Here too, the sole and the part of the shoe upper can be joined together by any known method.

FIG. 8 shows schematically a shoe upper as a three-dimensional object which has been shaped from the two-dimensional surface portion according to FIG. 7. The three-dimensional object can be fixed by, for example, adhesive bonding, tacking, riveting, welding, pinning of the heel parts in the region of the heel region 8. A further fixing is possible by applying the part of a shoe upper to a shoe sole 9. Here too, the sole and the part of the shoe upper can be joined together by any known method.

Figure 9:
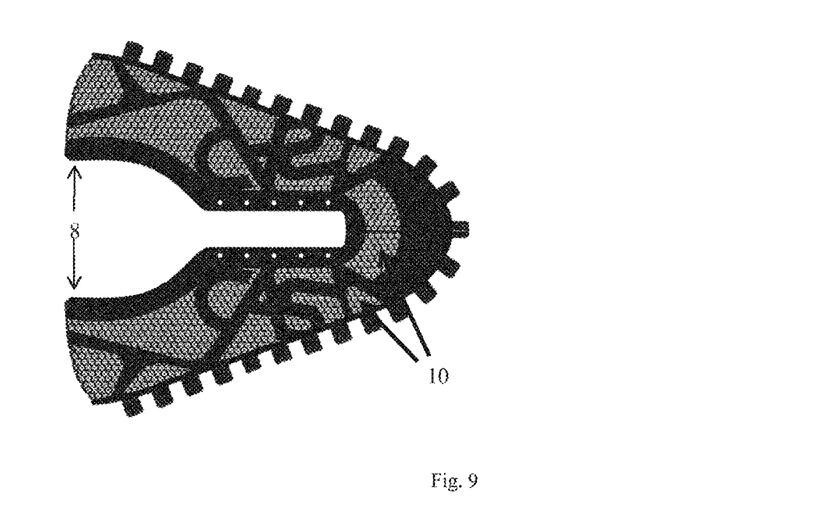

FIG. 9 shows schematically a two-dimensional surface portion for producing a shoe upper. This consists of two layers of parallel tracks, rotated through 90° relative to one another, two layers of a honeycomb structure lying one on top of the other, two layers of an all-over pattern with lettering, and a layer of eyelet reinforcement. The shoe upper again has a heel region 8 and openings 10 in the layers of the pattern or lettering.

Figure 10:
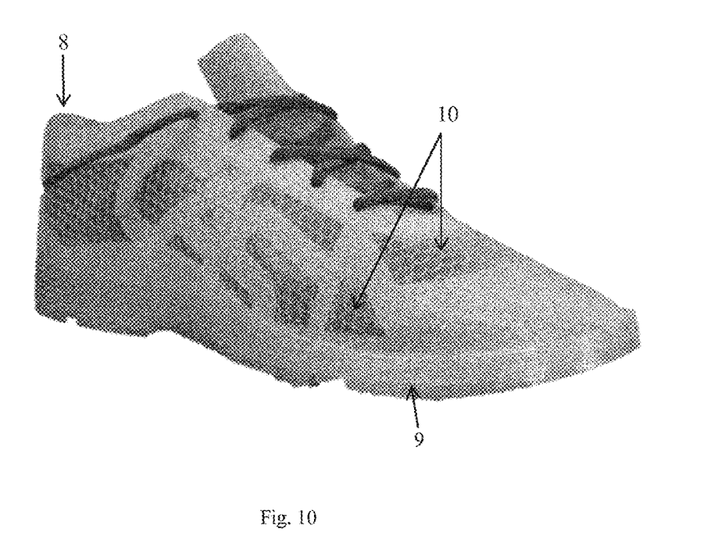
FIG. 10 shows a shoe and laces, wherein the shoe consists of a sole 9 and a shoe upper produced by the method according to the invention.

FIG. 10 shows a shoe and laces, wherein the shoe consists of a sole 9 and a shoe upper produced by the method according to the invention.

Figure 11:
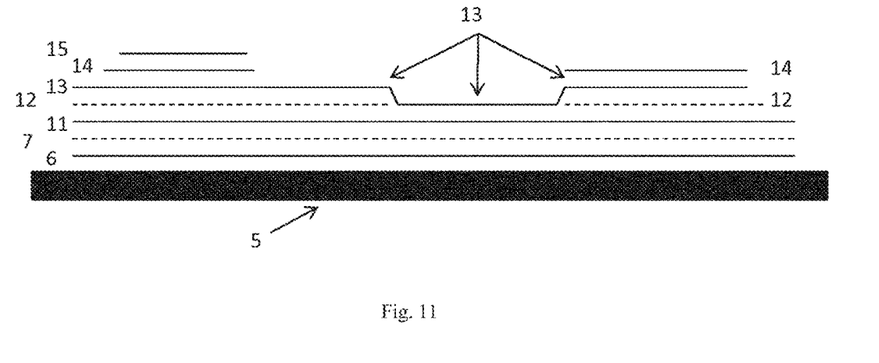
FIG. 11 shows a cross-section through the surface portion on a planar base plate 5 with the layers 6, 7 as well as further layers 11, 12, 13, 14, 15. In the figure, layers 7, 12 shown by broken lines denote those layers whose material tracks, here shown as individual points, are applied vertically relative to the plane of the paper. In the layers 6, 11, 13, 14, 15 shown by continuous lines, the corresponding material tracks run parallel to the plane of the paper. In the embodiment shown in FIG. 11, the maximum number of layers 6, 7, 11, 12, 13, 14, 15 is seven in total. In the middle region of the figure it will be seen that a portion of the layer 12 is cut out, so that the layer 13 comes to lie in this cut-out region on the layer 11 extending beneath the layer 12.

FIG. 11 shows a cross-section through the surface portion on a planar base plate 5 with the layers 6, 7 as well as further layers 11, 12, 13, 14, 15. In the figure, layers 7, 12 shown by broken lines denote those layers whose material tracks, here shown as individual points, are applied vertically relative to the plane of the paper. In the layers 6, 11, 13, 14, 15 shown by continuous lines, the corresponding material tracks run parallel to the plane of the paper. In the embodiment shown in FIG. 11, the maximum number of layers 6, 7, 11, 12, 13, 14, 15 is seven in total. In the middle region of the figure it will be seen that a portion of the layer 12 is cut out, so that the layer 13 comes to lie in this cut-out region on the layer 11 extending beneath the layer 12.

The following parameter ranges are preferred parameter ranges for the production of a two-dimensional surface portion according to the invention by means of FFF:
Temperature of the base plate: in the range from 20° C. to 90° C., in particular from 70° C. to 90° C., e.g. 80° C.
Temperature of the nozzle: in the range from 120° C. to 260° C.
Travelling speed: in the range from 1 mm/s to 60 mm/s
Filament diameter: in the range from 1.5 mm to 3.5 mm
Nozzle diameter: in the range from 0.3 mm to 1 mm
Layer thickness: in the range from 0.1 mm to 0.9 mm (smaller height than nozzle diameter results from distance between nozzle and uppermost layer< nozzle diameter→ material is pressed into a strand with an oval cross-section)
Track width: depending on the material nozzle, in the range from 0.3 mm to 1 mm.

It will explicitly be understood that the above-mentioned preferred values for the temperature of the base plate from 70° C. to 90° C. and 80° C. can be combined with all the other values of the above list, such as the temperature of the nozzle and the like.

EXAMPLE

As a non-limiting example, the production of a shoe upper and the subsequent production of a shoe having this shoe upper is described.

The two-dimensional shape for producing the shoe upper was produced using a German RepRap X400 CE PRO edition with a filament of thermoplastic polyurethane of Shore hardness 60A (ASTM D 2240; as at Apr. 16, 2015) according to FIG. 9.

The following parameters were used:
Temperature of the base plate: 80° C.
Temperature of the nozzle: 235° C.
Travelling speed: 30 to 40 mm/s
Filament diameter: 2.8 mm
Nozzle diameter: 0.5 mm
Layer thickness: 0.2 mm
Track density: Lattice structure (lower layers): track spacing between individual tracks=one nozzle outlet diameter; honeycomb structure=variable track density; and graphics (uppermost layer): 100% (tracks touch one another, which produces a complete layer).

The three-dimensional structure was fixed by welding in the heel region. Furthermore, the three-dimensional structure was fixed to the sole by welding and a complete shoe was thus produced.

A further example of a three-dimensional object produced by a method according to the invention is a tube. The lateral surface is printed layer by layer, 100% filled layers+ optional honeycomb structures for reinforcement ("fabric tube"), then shaped (rolled) and bonded or welded along the seam. The joining edge is preferably printed with a bevel so that a greater overlap and thus larger bonding surfaces are achieved (see FIG. 6). In addition to the preferred number of layers of 6 layers for a tube as shown in FIG. 6, the preferred number of layers for tubes is from 1 to 20 layers. Preferably, at least one of the layers has a honeycomb structure. Such a reinforcing structure can also be laid on, although this is less preferred.

The invention claimed is:

1. A method for producing a three-dimensional object having an outer surface comprising at least one surface portion which is generated by first producing on a planar base plate, by means of an additive manufacturing method, a surface portion in two-dimensional form, comprising:
   I) applying at least one curable polymer or curable reaction resin independently having an elastic modulus according to DIN 53504; Apr. 18, 2015 in a cured state of <250 MPa in flowable form as material tracks to the planar base plate by means of a layer-building shaping method in order to produce a first layer;
   II) applying a second layer to the first layer by means of the layer-building shaping method as in step I);
   III) optionally repeating step II) to apply from 1 to 48 further layers to a respective preceding layer;
   IV) curing the layers to form a unitary cured surface portion;
   V) detaching the unitary cured surface portion from the planar base plate;
   VI) shaping the unitary cured surface portion into a three-dimensional object; and
   VII) fixing the three-dimensional object by welding, adhesive bonding, stapling, tacking, nailing, riveting, stitching, pinning, Velcro-fastening, snap-fitting, or a combination thereof, of at least one partial surface of the three-dimensional object to at least one further partial surface of the three-dimensional object.

2. The method of claim 1, wherein the layer-building shaping method is fused filament fabrication, ink-jet printing or photopolymer jetting.

3. The method of claim 1, wherein the material tracks are applied in a form of drops to the planar base plate or one of the first layer or other respective preceding layer which may already be on the base plate.

4. The method of claim 1, wherein the same curable polymer or curable reaction resin is used in all the layers.

5. The method of claim 1, wherein at least one layer comprises a different curable polymer or curable reaction resin.

6. The method of claim 1, wherein at least one curable polymer or curable reaction resin for applying a layer is used in a form of a flowable and curable substance mixture.

7. The method of claim 1, wherein at least one curable polymer or curable reaction resin for applying a layer is used in a form of at least two different flowable and curable substance mixtures.

8. The method of claim 1, wherein curing is carried out by cooling thermoplastics, by cold or hot polymerization, polyaddition, polycondensation, addition or condensation or by polymerization initiated by electromagnetic radiation.

9. The method of claim 1, wherein curing is carried out by an ultraviolet or infrared light source guided immediately downstream of a spray nozzle.

10. The method of claim 1, wherein shaping is carried out by bending the two-dimensional surface portion, folding the two-dimensional surface portion, by placing the two-dimensional surface portion on a last, thermoforming where at least one hot-workable polymer is present in a two-dimensional surface portion, or a combination thereof.

11. The method of claim 1, wherein the three-dimensional object is a shoe upper.

12. The method of claim 1, wherein the three-dimensional object is a tubular structure, a support corset, or a protector for a shoulder, upper arm, lower arm, thigh, shin, torso, elbow or knee.

13. The method of claim 1, wherein the first layer is applied to an interlayer such as a textile or a film which reproduces the flat form of the planar base plate on the first layer, and with which the material tracks of the first layer bond, so that the interlayer becomes part of the surface portion and thus also part of the three-dimensional object.

* * * * *